US006185817B1

(12) United States Patent
Sims et al.

(10) Patent No.: US 6,185,817 B1
(45) Date of Patent: Feb. 13, 2001

(54) TOOL FOR REMOVING A PROPELLER FROM A DRIVE SHAFT

(75) Inventors: Billy R. Sims, Edgewood; Ordie G. Lorentz, Richardson, both of TX (US)

(73) Assignee: Duel Products, Inc.

(*) Notice: Under 35 U.S.C. 154(b), the term of this patent shall be extended for 0 days.

(21) Appl. No.: 09/113,639

(22) Filed: Jul. 10, 1998

(51) Int. Cl.[7] .............................. B21K 3/04; B23P 19/04

(52) U.S. Cl. ............................ 29/889.1; 29/270; 29/259; 29/426.5; 29/256

(58) Field of Search .................................. 29/23.51, 258, 29/259, 270, 889.1, 402.03, 426.5, 251, 252, 402.01, 402.02, 402.04, 256, 724, 426.1, 559

(56) References Cited

U.S. PATENT DOCUMENTS 1,324,704 * 12/1919 Vose .
1,345,186 * 6/1920 Holland .................................. 29/259
1,426,835 * 8/1922 Mohrman .............................. 29/259
1,573,572 * 2/1926 Rees .
1,629,003 * 5/1927 Schonfeld ............................. 29/259
1,705,011 * 3/1929 Godman ................................ 29/259
1,879,334 * 8/1932 Kulp et al. ............................ 29/259
4,065,844 * 1/1978 Lieser et al. .......................... 29/258
4,077,103 * 3/1978 Kelley .................................... 29/259
4,451,959 * 6/1984 Miller et al. .
4,460,209 * 7/1984 Lyerly .
4,492,014 * 1/1985 Alexander .............................. 29/259
4,542,570 * 9/1985 Prince .
4,542,571 * 9/1985 Sullivan ................................ 29/256
4,663,814 * 5/1987 Beck ..................................... 29/240
4,800,637 * 1/1989 Overbay .............................. 29/157.4
4,864,709 * 9/1989 Klucz et al. ........................... 29/259
5,306,093 * 4/1994 Elbert .................................. 403/259
5,479,688 * 1/1996 Rubino et al. ......................... 29/259
5,606,788 * 3/1997 Rubino et al. ......................... 29/259
5,836,067 * 11/1998 Cochran ............................... 29/263
5,865,018 * 2/1999 Wanie .................................. 29/283

* cited by examiner

*Primary Examiner*—S. Thomas Hughes
*Assistant Examiner*—Steve Blount
(74) *Attorney, Agent, or Firm*—Arthur I. Navarro

(57) ABSTRACT

A tool for removing a propeller from a drive shaft having a damaged shear pin. The tool has a plurality of fingers for engaging the blades of the propeller and an advancement member for leveraging against the distal end of the shaft. The advancement member leverages against the drive shaft to cause the tool to pull the propeller assembly from the drive shaft to facilitate the replacement of the damaged shear pin. The tool fingers engage and restrict the rotation of the propeller blades with respect to the tool as the advancement member is leveraged against the drive shaft.

16 Claims, 4 Drawing Sheets

TOOL FOR REMOVING A PROPELLER FROM A DRIVE SHAFT

FIELD OF THE INVENTION

The present invention is generally related to propellers adapted to engage a shear pin disposed through a propeller shaft, and more particularly to a tool adapted to assist in removing the propeller from the propeller shaft when the shear pin becomes damaged or broken.

BACKGROUND OF THE INVENTION

There are many types of propellers adapted for use with watercraft motors. Each propeller is designed to be suitable for an intended use, such as for high speed, high torque, use in a weedy environment and so forth. From a mechanical standpoint, the propeller is secured to a drive shaft for rotation therewith. To prevent damage to the motor and drive shaft should the propeller engage an obstruction or fixed object, the drive shaft is typically provided with a shear pin which is disposed through a bore defined radially through the drive shaft. The propeller is adapted about the drive shaft and engages the shear pin such that the propeller is rotatably driven by the extensions of the shear pin. Should the propeller engage a fixed structure or obstruction, such as a rock, tree limb, stump or the bottom of a lake, the shear pin is mechanically constructed to deform or break, thereby momentarily or permanently disengaging the propeller from the drive shaft to avoid damaging the engine or drive shaft. Thus, the propeller will cease to rotate, either temporarily or permanently, due to the deforming or breaking of the shear pin. In essence, the shear pin is the safety mechanism or "circuit breaker" that prevents damage to the engine and drive shaft driving the propeller.

When the shear pin becomes damaged or broken, replacement of the pin is necessary. If the shear pin becomes damaged or bent, typically the propeller will vibrate and generate excessive vibration and noise which is noticeable to the operator and renders the operation of the propeller inefficient. Removing and replacing the shear pin is cumbersome and difficult for the operator. Often, it is difficult to remove the propeller from the drive shaft due to the location of the propeller with respect to the boat and the operator, and, due to the fact that the propeller often becomes jammed against the drive shaft due to the damage of the shear pin. Often times, a boat operator will attempt to remove the jammed propeller to gain access to the shear pin by using conventional tools, such as screwdriver, to leverage the propeller from the drive shaft. Often times, this leveraging damages and renders totally useless the propeller since the propeller is often comprised of plastic and can become cracked. One conventional prior art propeller implementing a shear pin is described in U.S. Pat. No. 4,482,298 which discloses a weedless propeller, the teachings of which are incorporated herein by reference. One embodiment of this propeller is shown in FIGS. 1–3 of the present application. This propeller is widely used throughout the industry. Unfortunately, this propeller is prone to damage if not removed properly, as it is typically comprised of plastic and cracks when the operator attempts to remove the propeller to gain access to the damaged shear pin.

The present invention sets forth a tool to facilitate effectively removing a propeller from the corresponding drive shaft when the shear pin becomes broken or damaged.

SUMMARY OF THE INVENTION

The present invention achieves technical advantages as a tool for effectively removing a propeller blade from a drive shaft when a shear pin becomes damaged or broken. The tool of the present invention has a mechanism for engaging the blades of the propeller to prevent rotation of the blades with respect to the tool. An advancement member is disposed through an axis of the tool and is adapted to leverage against the distal end of the drive shaft as a leverage point. By advancing the advancement member against the drive shaft, the tool effectively removes the propeller from the drive shaft to expose the damaged shear pin without damaging the propeller.

According to the preferred embodiment of the present invention, the tool comprises a body member having a central axis. A securing mechanism is coupled to the body member and is adapted to engage the blades of the propeller and also to prevent the rotation of the propeller with respect to the body member. An advancement mechanism is disposed proximate the body member central axis and is adapted to leverage against the propeller shaft to thereby cause the securing mechanism to remove the propeller from the drive shaft. Preferably, the body member has a major surface having a configuration adapted to lie juxtaposed to the propeller face. The securing mechanism preferably comprises a plurality of fingers extending substantially perpendicular from the body member major surface. Preferably, the fingers each extend from an edge of the body member and are spaced equidistant from the each other. The fingers each have a distal end preferably are shaped to adapt securely against the respective blade of the propeller when disposed about the propeller. Preferably, the distal ends are cupped. In the preferred embodiment, the advancement mechanism preferably comprises an adjustment member extending along a central axis of the body member and is axially adjustable therealong to adjust a spacing between the body member and the drive shaft. The body member preferably has a threaded hole. The adjustment member comprises a threaded member threadably disposed within the body member threaded hole. The threaded member has a handle adapted to be grasped by a human hand for rotating the threaded member. In each of the various embodiments, the tool preferably has the same number of fingers as the number of blades of the propeller the tool is adapted to be engaged against, but this is not required.

A method of the present invention uses the tool of the present invention to remove the propeller from the drive shaft. The method comprises disposing the tool about the propeller such that the securing mechanism engages the propeller blades and restricts the rotation of the body member with respect to the propeller. Thereafter, the advancement mechanism is advanced against the propeller shaft to cause the tool to remove the propeller from the propeller shaft. The cupped ends of the fingers grasp the backside of the propeller blades to pull the propeller shaft off and away from the distal end of the drive shaft without damaging the propeller.

DESCRIPTION OF THE PREFERRED EMBODIMENT

Figure 2:
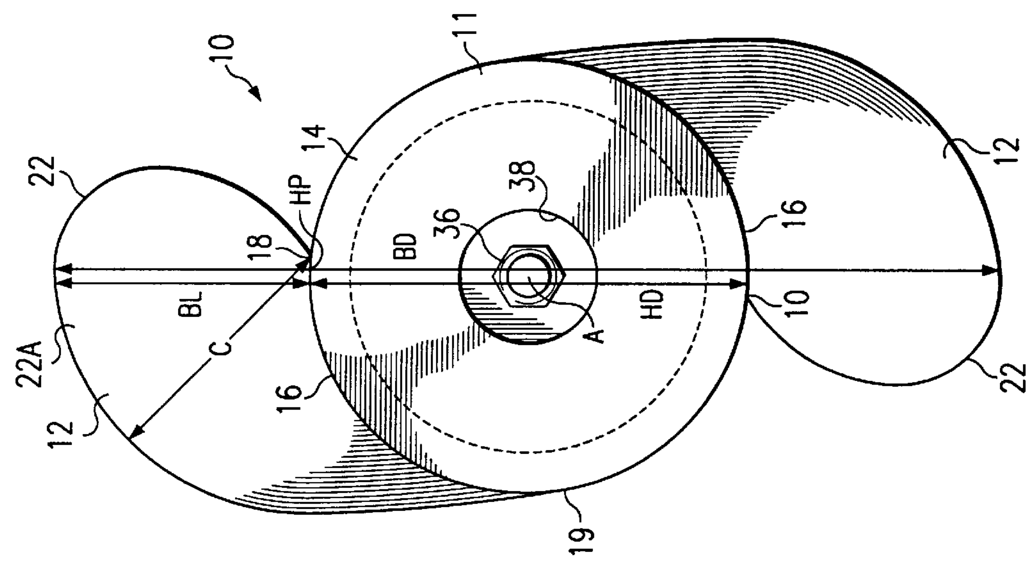
FIG. 2 (PRIOR ART)
FIG. 2 is a rear view of the prior art propeller shown FIG. 1.
Figure 1:
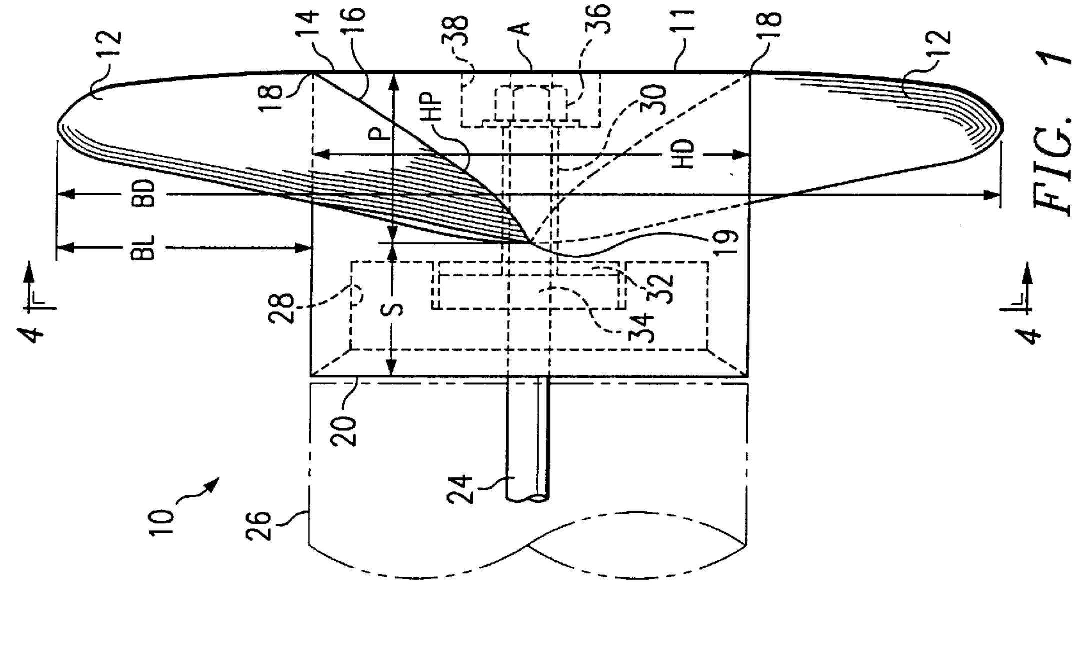
FIG. 1 (PRIOR ART)
FIG. 1 is a side elevational view of a prior art propeller that the tool of the present invention is adapted to remove from a drive shaft.
Figure 3:
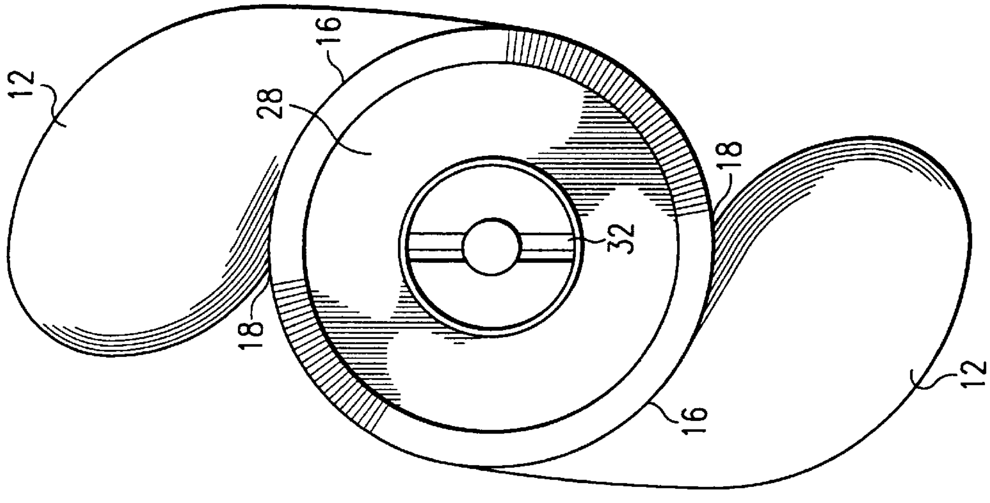
FIG. 3 (PRIOR ART)
FIG. 3 is a front view of the prior art propeller show in FIG. 1.

Referring first to FIG. 1, FIG. 2 and FIG. 3, there is shown one prior art propeller blade that the tool of the present invention is well suited for use therewith. The propeller blade shown in FIGS. 1–3 is provided for illustration purposes to fully understand and appreciate the advantages of the present invention, and limitation to a tool suitable for use with only this particular propeller is not to be inferred. Rather, FIGS. 1–3 illustrate one intended use of the present invention, with the scope of the present invention being defined by the appended claims.

FIGS. 1, 2 and 3 are a side elevational view, a rear view, and a front view of the preferred embodiment of the propeller 10 of the invention. The propeller 10 comprises a primary hub, denoted by the letter "P", and a secondary hub, denoted by the letter "S", which is connected to the forward end of the primary hub P. The hub includes a hub wall 11 to prevent fluid flow therethrough. The primary hub has an outer surface defined between a lading blade edge 19 and the trailing blade edge 18 with a hub point HP midpoint between the root of the leading and trailing blade edges of the blade 12 which defines a hub diameter HD therebetween. A plurality of propeller blades 12 are integrally molded to and extend radially from the primary hub P. The rearward end 14 of the primary hub P is bluntly terminated at the trailing blade end 18 at the root 16 of the blades 12. The longitudinal length of the secondary hub S is substantial, such that the forward end 20 of the secondary hub S will be positioned a substantial distance from the primary hub P. The blades 12 are designed to produce thrust upon rotation. The blades define a blade length BL extending radially from an axis of rotation A from the hub diameter to a blade diameter BD defined by the rotation of the most distal point of the blades. The hub diameter HD is at least as great as the blade length BL. Each of the plurality of blades is swept back in a direction generally opposite to the normal rotation of the propeller with the majority of the surface area 22A of each of said blades being disposed on one side of a radial line (HD-BL) extending through said hub point HP. Preferably, however, the chord, represented by the distance "C" of each of the blades 12 progressively decreases from the root 16 to the tip 22 of the blade 12. The interior of the propeller 10 is designed to be connected to the drive shaft 24 of the drive mechanism 26 which rotates the drive shaft 24 (see FIG. 4). The interior of the propeller 10 includes a major cavity 28 positioned concentrically within the secondary hub S. An axial hole 30 is then positioned concentric with the cavity 28 and extends through the remaining length of the secondary hub S and through the entire length of the primary hub P. The axial hole 30 is dimensioned for slidably receiving the drive shaft 24. A recess 32 or keyway is positioned within the bottom of the cavity 28 for receiving a shear pin 34 which extends diametrically through the drive shaft 24. A nut 36 threadably engages the terminal end of the drive shaft 24 for tightly securing the propeller 10 thereto. The nut 36 may be recessed in a counterbore portion 38 of the rearward end 14 of the primary hub P.

Figure 4:
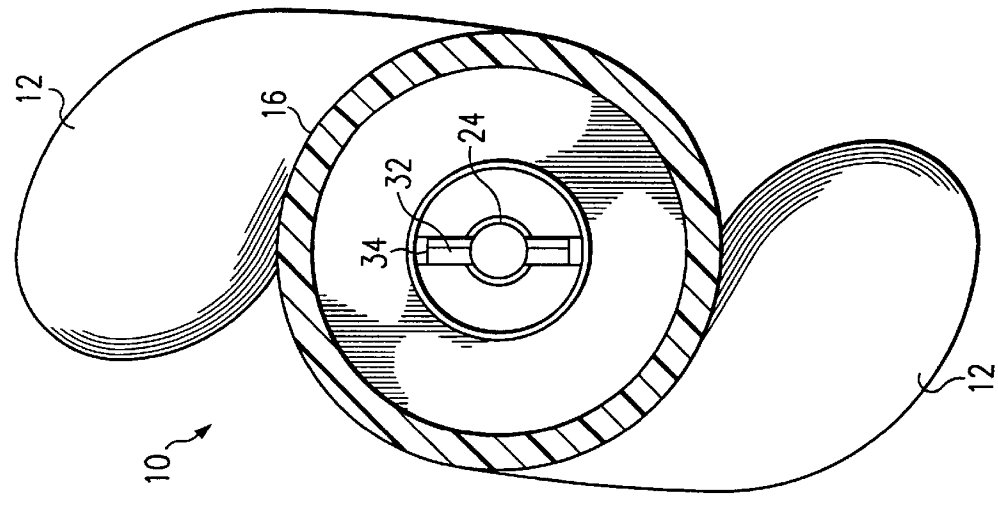
FIG. 4 is a rear view of the propeller taken along line 4—4 in FIG. 1, illustrating a damaged shear pin extending through the drive shaft.

Referring now to FIG. 4, there is illustrated a sectional view of the propeller 10 adapted about the drive shaft 24 taken along line 4—4 in FIG. 1. As illustrated, the shear pin 34 is seen in this embodiment to be damaged such that it is warped or twisted within keyway 32 and through the bore defined through the drive shaft 24. FIG. 4 illustrates a typical configuration of a damaged shear pin 34 when the blades 12 of propeller 10 unexpectedly or unintentionally engage a lake obstruction, such as a tree stump, rock etc. Due to the rotation of the propeller 10 and the torque generated by the motor driving drive shaft 24, the shear pin 34 will become twisted proximate the entry point and exit point of the drive shaft 24, as illustrated. This twisting causes the pin 34 to be damaged whereby the pin is actually wedged within the keyway 32. This wedging of shear pin 34 within the keyway 32 inhibits the removal of the propeller assembly 10 from the drive shaft 24 to expose the shear pin 34 and facilitate removal and replacement of the shear pin. The tool of the present invention, as will now be described in considerable detail, is designed to facilitate the removal of the propeller 10 from the drive shaft 24 when the shear pin 34 becomes damaged or broken, such as shown in FIG. 4.

Figure 6:
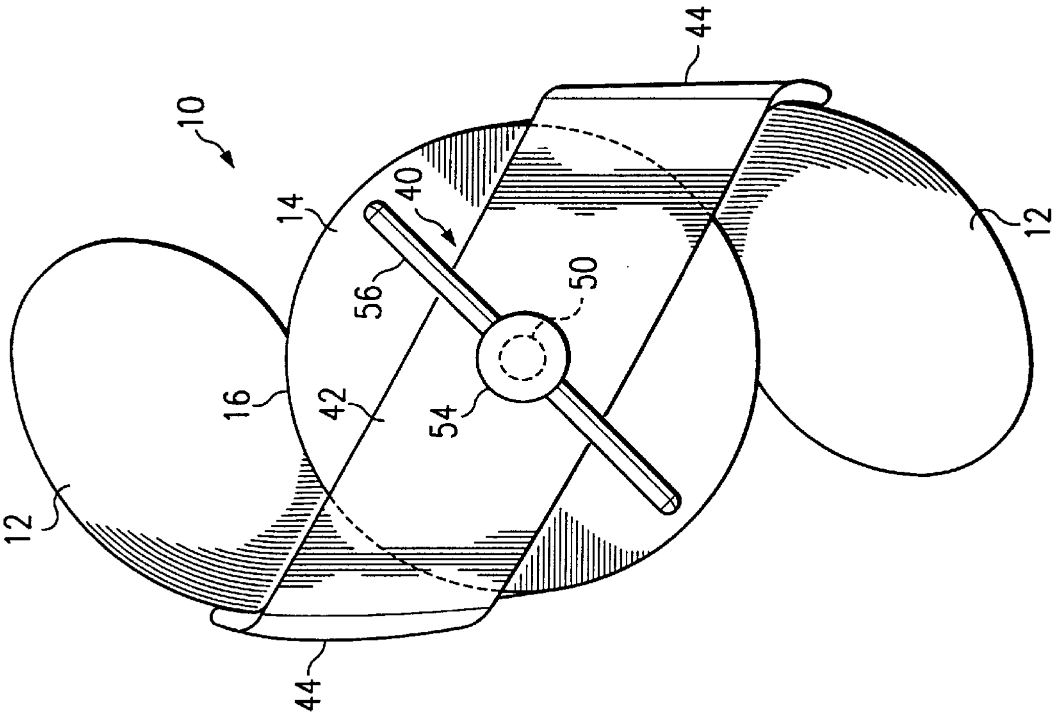
FIG. 6 is a front view of the tool and propeller assembly of FIG. 5 illustrating the tool adapted to the propeller with the fingers grasping the back side of the respective propeller blades, with the threaded adjustment member being axially disposed through the body member against the distal end of the drive shaft.
Figure 5:
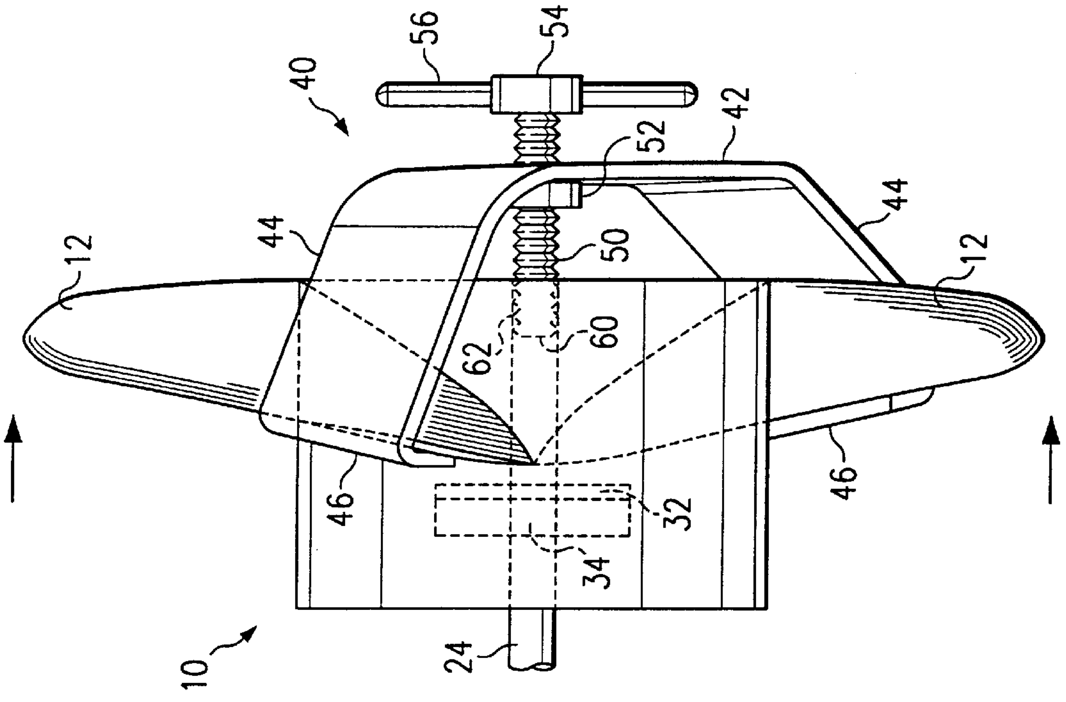
FIG. 5 is a side elevational view of one preferred embodiment of the tool of the present invention positioned against a two blade propeller illustrating the tool leveraging against the distal end of the drive shaft to pull the propeller off the drive shaft and expose the damaged shear pin.

Referring now to FIG. 5 and FIG. 6, there is shown a first preferred embodiment of the present invention shown as tool 40. Tool 40 is seen to comprise of an elongated body member 42 having a pair of opposed fingers 44 each extending substantially perpendicular from the body member 42. Fingers 44 terminate at a distal end 46 and are cupped inwardly with respect to the body member 42. The width of the body member 42 and the associated fingers 44 is sufficient to allow the distal ends 46 of fingers 44 to securely abut against the backside of the respective blade 12, as shown. Axially disposed through the body member 42 is seen to be an elongated advancement member 50 comprised of a threaded member being disposed through a threaded boss 52 securely defined on the underside of body member 42. The proximal end of threaded member 50 terminates at a handle 54 having a pair of radially extending level arms 56. As shown, tool 40 is provided with the same number of fingers 44 as there are numbers of blades 12. The fingers 44 are equidistantly spaced from one another as well. The cupped distal ends 46 are seen to be angled such that they conformly extend along the edge of the angled blade 12, and thus securely abut and engage the front or leading edge of the blade 12. Thus, the distal ends of the fingers 46 grasp about the leading edge of the respective blade 12.

In use, the tool 40 is adapted about the propeller 10 as shown in FIG. 5 and FIG. 6. Thereafter, the handle 54 is rotated using levers 56 in the clockwise direction to advance the distal end 60 of the threaded member 50 against the distal end 62 of shaft 24. As handle 54 is continued to be rotated by the user, the distal end 60 of the threaded member 50 eventually abuts and engages the distal end 62 of drive shaft 24, as shown in FIG. 5. As the handle 54 is continued to be rotated, the threaded member 50 will leverage against the distal end 62 of shaft 24, thereby causing the finger ends 46 of tool 40 to apply an even and symmetrical force against the respective blades 12 to remove the propeller 10 from shaft 24. The force is applied in the axial direction along the shaft 24 to facilitate the removal of the propeller 10, and to avoid any damage to the propeller 10. The point force extended by the fingers 46 along the leading edge of the blades 12 is spread in the lateral direction to avoid damage to the blades 12. Upon continued rotation of the handle 54, the tool 40 eventually removes the propeller 10 from the drive shaft 24 to extract the damaged shear pin 34 from the keyway 32 of propeller 10. Thereafter, the shear pin 34 can be replaced with a new pin, and propeller 10 is readapted to the drive shaft 24 in the conventional manner.

The length of advancement member 50 is sufficiently long to allow continued advancement against the drive shaft 24 distal end 62 such that the handle 54 will remain spaced from the upper surface of body member 42 until the propeller 10 is removed from drive shaft 24. As shown in FIG. 6, for a two-blade propeller assembly 10, the tool 40 generally has a "Z" shape, and the body member 42 is positioned to be juxtaposed above the end surface of the propeller assembly 10, as shown in FIG. 5. It is intended that other equivalent configurations of fingers 44 and distal ends 46 are suitable for securing against the respective blades 12, and limitation to the preferred embodiment shown in FIG. 5 and in FIG. 6 is not to be inferred. Moreover, other means for leveraging the tool against the distal end of drive shaft 24 could be provided as well, and limitation to the threaded member 50 is not to be inferred.

Figure 7:
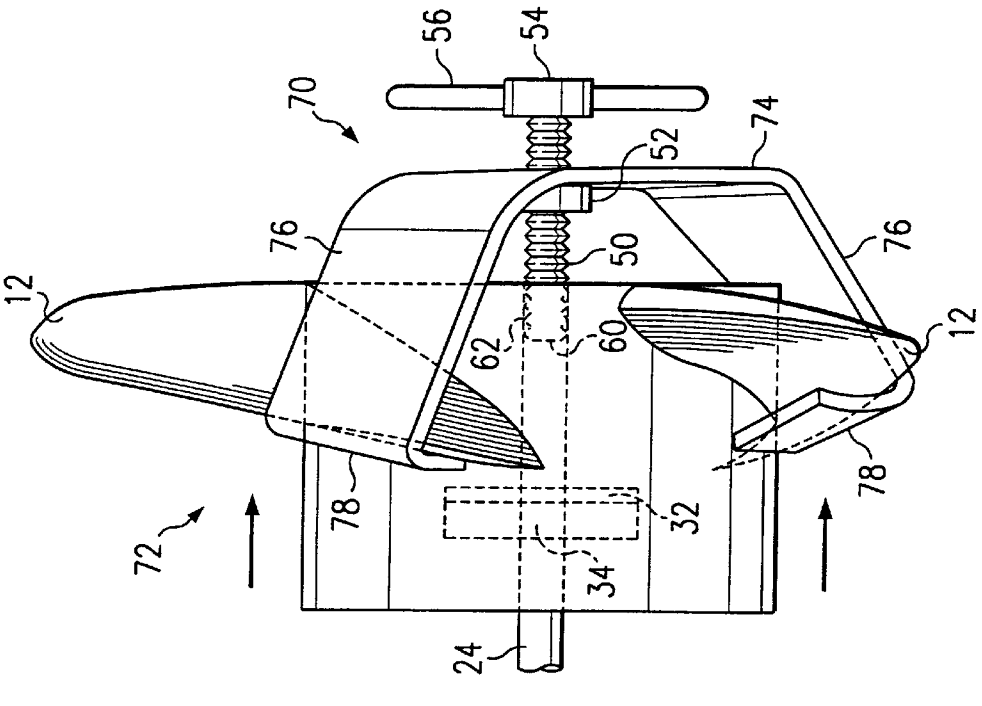
FIG. 7 is a side view of a tool member according to another preferred embodiment of the present invention adapted to remove a propeller blade having three blades.

Referring now to FIG. 7, there is shown a second preferred embodiment of the present invention shown as tool 70 adapted for removing a three blade propeller generally shown at 72. Tool 70 is similar to tool 40 wherein like numerals refer to like elements.

In this embodiment tool 70 has a generally triangular shaped body member 74 having three fingers 76 with respective cupped distal ends 78. Each of fingers 76 is equidistantly spaced from the next, and thus, are spaced approximately 120 degrees from each other. Each of the fingers 76 extends substantially perpendicular from the edge of the body member 74, whereby the distal end 78 are cupped to engage the backside or leading surface of the respective propeller blade 12.

Figure 8:
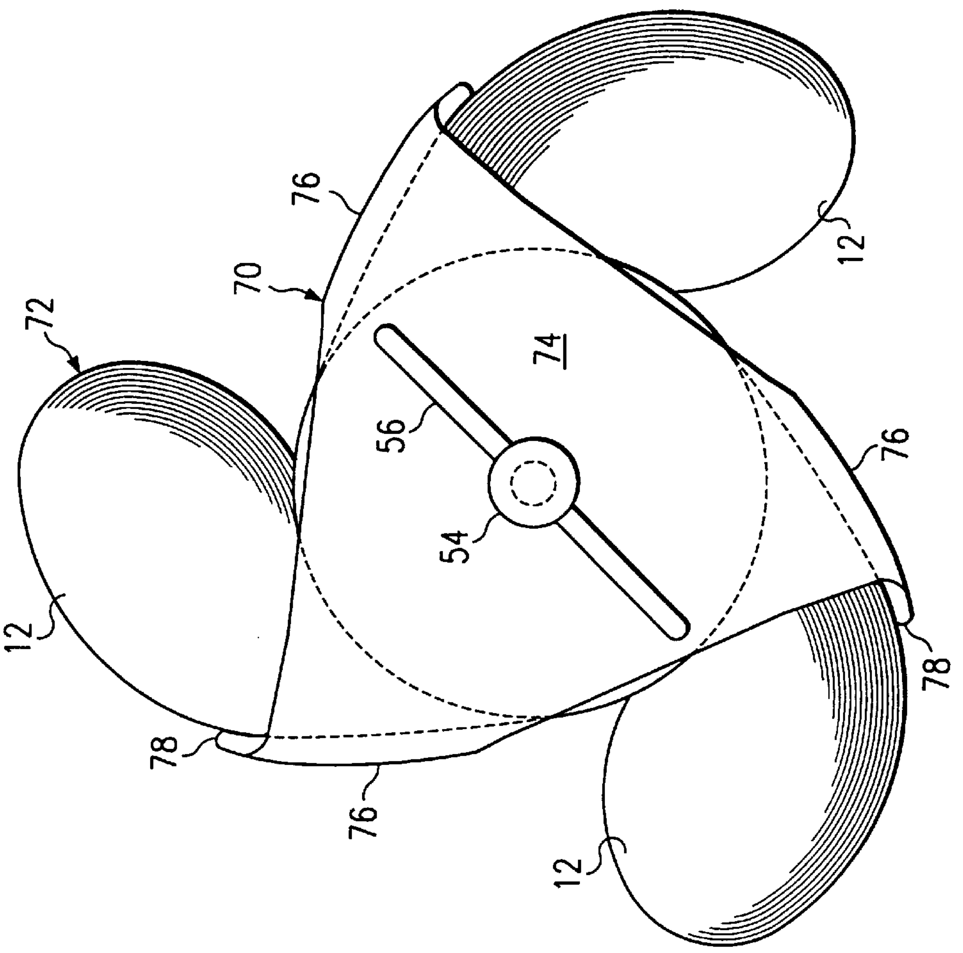
FIG. 8 is a front view of the tool and propeller assembly of FIG. 7 illustrating three fingers of the tool being adapted to and engaging the back sides of the respective propeller blades to facilitate removal of the propeller from the drive shaft.

As shown in FIG. 8, during use the tool 70 is first adapted about the respective propeller 72 and rotated clockwise until the cupped fingers 78 engage against the leading surface of the respective blades 12, as shown in FIG. 8. Thereafter, the handle 54 is rotated clockwise to advance the distal end 60 of threaded member 50 against the distal end 62 of drive shift 24, as shown in FIG. 7. Upon continued rotation of handle 54, the distal end 60 of threaded member 50 will continue to abut and engage the distal end 62 of shaft 24 to provide a leverage point By leveraging against the distal end 62 of shaft 24, the fingers 76 will engage and apply an even and symmetrical axial force against the respective blades 12 to remove the propeller assembly 72 from the drive shaft 24 to expose the damaged shear pin 34 extending through the bore of drive shaft 24. The user may then replace the damaged shear pin 34, and then reattach the propeller assembly 72 in a conventional manner.

The present invention achieves technical advantages by providing a simple, inexpensive tool to remove a propeller assembly from a drive shaft having a damaged shear pin 34 wedged within the propeller assembly keyway 32. The tool provides an even, axial force against the respective engaged blades 12 without causing damage to the propeller assembly. Therefore, the propeller assembly can be reused upon replacement of the damaged shear pin 34.

Two embodiments of the present invention have been shown and discussed in considerable detail to illustrate the present invention. However, limitation to the number of fingers, the shapes of the fingers, or other features of the tool are not intended as a tool adapted to remove a propeller having other designs or numbers of blades is contemplated by the present invention as well. Moreover, while it is preferred that there are the same number of fingers as there are blades, this is not required, such as in the case of a four blade propeller whereby tool 10 having only two fingers to provide an equal and symmetrical force against the propeller to be removed is sufficient. Thus, it is intended that a four finger tool could be provided, although a two finger tool, such as that shown in FIG. 5 and FIG. 6, is suitable for removing such a propeller assembly.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A tool for assisting the removal of a propeller having a propeller face and a plurality of blades from a rotatable drive shaft, comprising:

a) a body member comprising an enlongated major surface having a configuration adapted to lie juxtaposed to said propeller face and a securing means extending substantially perpendicular from the elongated major surface, the body member having a central axis, the securing means coupled to said body member and adapted to engage the blades of the propeller and to prevent rotation of said propeller with respect to said body member; and b) advancement means disposed proximate said body member central axis and adapted to leverage against the drive shaft to cause said securing means to remove the propeller from the drive shaft.

2. The tool as specified in claim 1 wherein said securing means comprises a plurality of fingers.

3. The tool as specified in claim 2 wherein said fingers extend substantially perpendicular from said elongated major surface and engage the propeller when rotated clockwise about the propeller.

4. The tool as specified in claim 2 wherein said fingers extend from an edge of said body member.

5. The tool as specified in claim 2 wherein said fingers are spaced approximately equidistant from each other.

6. The tool as specified in claim 2 wherein said fingers further have a distal end shaped to adapt securely against a respective blade of said propeller when disposed about the propeller.

7. The tool as specified in claim 6 wherein said finger distal ends are cupped.

8. The tool as specified in claim 1 wherein said advancement means comprises an adjustment member extending along said central axis of said body member and being axially adjustable therealong, the body member and the drive shaft having a distance therebetween, the adjustment member for selectively adjusting the distance between the body member and the drive shaft.

9. The tool as specified in claim 8 wherein said body member has a threaded hole, and said adjustment member comprises a threaded member threadably disposed within said threaded hole.

10. The tool as specified in claim 9 wherein said threaded member has a handle adapted to be grasped by a human hand for rotating said threaded member.

11. The tool as specified in claim 2 wherein said tool has the same number of said fingers as the number of blades of the propeller.

12. The tool as specified in claim 1 wherein said tool advancement means has structure adapted to apply enough leverage against the propeller shaft for removing the propeller from the drive shaft when a shear pin is damaged.

13. The tool of claim 1 wherein the securing means has approximately the shape of the blades.

14. The tool of claim 1 wherein the elongated major surface is generally triangular in shape.

15. A method using a tool to remove a propeller having a plurality of blades from a rotatable drive shaft, said tool comprising:

a) an enlongated body member major surface having a securing means extending substantially perpendicular from the elongated body member major surface, the elongated body member having a central axis;

b) securing means coupled to said elongated body member major surface adapted to engage the blades of the propeller and to prevent rotation of said propeller with respect to said elongated body member major surface;

c) advancement means disposed proximate said central axis and adapted to leverage against the drive shaft to cause said securing means to remove the propeller from the drive shaft, comprising the steps of:

disposing the tool about the propeller such that the securing means engages the propeller blades and restricts rotation of the elongated body member major surface with respect to the propeller; and advancing the advancement means against the drive shaft to apply leverage to cause the tool to remove the propeller from the drive shaft.

16. The method as specified in claim 15 wherein the securing means comprises fingers having cupped ends, comprising the step of disposing the fingers against the propeller blades to engage and restrict rotation of the propeller with respect to the tool.

* * * * *